United States Patent
Kakitsuba

(10) Patent No.: US 8,448,192 B2
(45) Date of Patent: May 21, 2013

(54) COMPUTER READABLE MEDIUM STORING A UNIVERSAL DRIVER, METHOD OF CONTROLLING A DEVICE AND APPARATUS

(75) Inventor: Ryota Kakitsuba, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 221 days.

(21) Appl. No.: 13/075,251

(22) Filed: Mar. 30, 2011

(65) Prior Publication Data
US 2012/0030690 A1    Feb. 2, 2012

(30) Foreign Application Priority Data
Jul. 29, 2010    (JP) ................. 2010-170712

(51) Int. Cl.
*G06F 13/00*    (2006.01)
(52) U.S. Cl.
USPC .................................. 719/321; 719/327
(58) Field of Classification Search
USPC .................................. 719/321, 327
See application file for complete search history.

(56) References Cited

U.S. PATENT DOCUMENTS

| | | | | |
|---|---|---|---|---|
| 7,581,050 B2 * | 8/2009 | Honda | | 710/240 |
| 7,788,355 B2 * | 8/2010 | Maeda | | 709/223 |
| 2009/0187752 A1 * | 7/2009 | Hirai | | 713/1 |
| 2010/0039662 A1 * | 2/2010 | Reddy et al. | | 358/1.15 |

FOREIGN PATENT DOCUMENTS

JP    2009-301312    12/2009

* cited by examiner

*Primary Examiner* — Andy Ho
(74) *Attorney, Agent, or Firm* — Banner & Witcoff, Ltd.

(57) ABSTRACT

A non-transitory computer readable medium has a universal driver executable on a computer. The universal driver includes instructions for: selecting a device for executing a function from connected devices according to an input from a user; sending a request to the operating system to set a communication port for communication with the selected device as a specified port; storing port identification information of a communication port for communication with the selected device and associated with the user in a memory; determining whether port identification information of the specified communication port matches the port identification information of the communication port associated with the user; sending a control command to the device to execute the function via the specified communication port according to a result of the determination indicating a match; and notifying the user of a different port being set as a specified port according to a result indicating a non-match.

20 Claims, 12 Drawing Sheets

COMPUTER READABLE MEDIUM STORING A UNIVERSAL DRIVER, METHOD OF CONTROLLING A DEVICE AND APPARATUS

CROSS REFERENCE TO RELATED APPLICATION

The present application claims priority from Japanese Patent Application No. 2010-170712, which was filed on Jul. 29, 2010, the disclosure of which is incorporated herein by reference in its entirety.

TECHNICAL FIELD

The present disclosure relates to a non-transitory computer readable medium storing a universal driver executable on a computer including an operating system, a method of controlling a device using a computer and a apparatus.

BACKGROUND

An universal driver controllable of a plurality of models of devices has been conventionally well-known.

A general universal driver allows an user to designate a device for executing a function and requests an operating system to set a communication port for communication with a designated device as "communication port to be used". After that, with an execution instruction input by an user, the universal driver outputs a control command to a communication port set as "communication port to be used".

Additionally, in the universal driver, it is generally unnecessary to set a device each time. When executing a function with a device same as the last time, an user can input an execution instruction without designating a device.

SUMMARY

There may be a case where a plurality of universal drivers is shared in one computer. In such a case, one user may designate a device and execute a function, then another user may designate a device different from the prior one and execute a function, and after that, the user who designated a device on ahead may intend again to execute a function using the device same as the last time.

In this case, when the user who selected a device on ahead does not know that "communication port to be used" has been changed by another user, and inputs an execution instruction without designating a device, a device other than the device the user intended to use (a device selected by another user) executes a function.

According to an aspect of the present invention, a non-transitory computer readable medium has a universal driver executable on a computer including an operating system. The universal driver comprises instructions for: selecting a device for executing a function from devices connected to the computer with communication channels according to an input from a user of the universal driver; sending a request to the operating system to set a communication port for communication with the selected device as a specified port; storing port identification information of a communication port for communication with the selected device and associated with the user in a memory; determining whether port identification information of the specified communication port matches the port identification information of the communication port associated with the user upon issuance of a request for executing the function from the operating system; sending a control command to the device to execute the function via the specified communication port according to a result of the determination indicating a match; and notifying the user of a different port being set as a specified port according to a result of the determination indicating a non-match.

BRIEF DESCRIPTION OF THE DRAWINGS

Illustrative aspects will be described in detail with reference to the following drawings wherein.

DETAILED DESCRIPTION

<Illustrative Aspect 1>

Illustrative aspect 1 will be hereinafter explained with reference to FIGS. 1 to 7.

(1) Configuration of Computer

Figure 1:
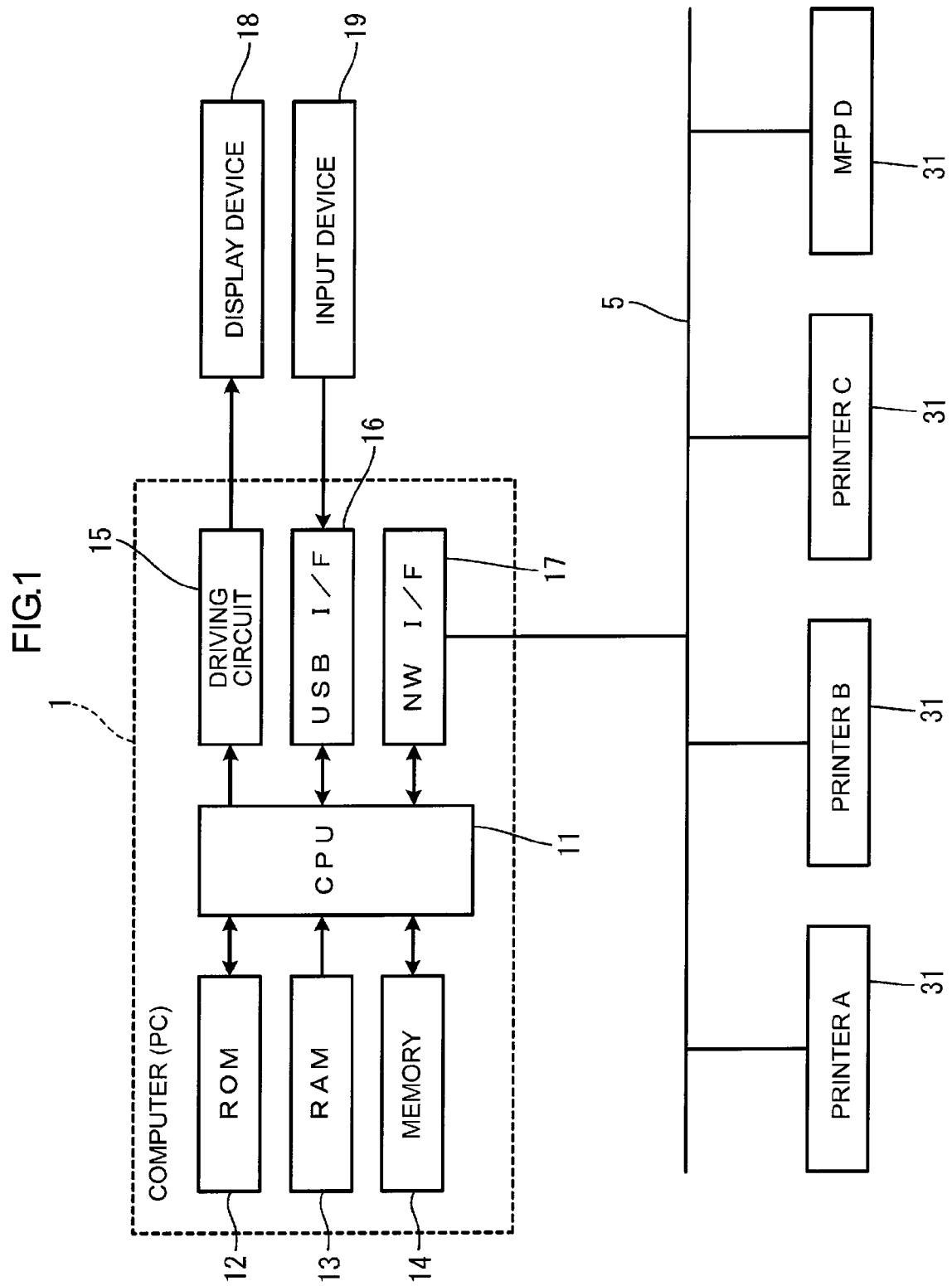
FIG. 1 is a block diagram showing an electrical configuration of a computer according to Illustrative aspect 1.

FIG. 1 is a block diagram showing an electrical configuration of a computer according to Illustrative aspect 1. A computer 1 (hereinafter, referred to as "PC") comprises a CPU 11, a ROM 12, a RAM 13, a memory 14, a display driving circuit 15 (driving circuit), an USB interface 16 (USB I/F), a network interface 17 (NW I/F), and the like.

The CPU 11 controls each part of the PC 1 by executing various programs stored in the ROM 12 and the memory 14. The ROM 12 stores various programs and data to be executed by the CPU 11. The RAM 13 is used as a main storage device for the CPU 11 for execution of various processing.

The memory 14 is a nonvolatile memory for recording various programs and data with a hard disk, a flash memory, and the like. Stored in the memory 14 are an operating system (OS), application programs of word processor and table calculation (hereinafter, referred to as "applications"), an universal printer driver (an example of an universal driver), and the like. The present illustrative aspect is explained using Windows®, Microsoft Corporation, as an example of the OS. The OS is not limited to Windows®.

The display driving circuit 15 drives a display device 18, such as a CRT, a liquid crystal display, and the like), and is connected thereto via a cable.

The USB interface 16 is constituted as an USB (Universal Serial Bus) host interface and connected to an input device 19, such as a mouse and a keyboard, via an USB cable.

The network interface 17 is communicatively connected to one or more printers 31 (an example of a device) via a communication network 5, such as a LAN and the internet.

(2) Printer

Printers 31, such as printers A to C, and an MFP D (an example of a device) are devices for forming an image on a recording medium, such as a paper sheet, in an inkjet or an electrophotographic system. An MFP is a device comprising functions of a printer and a scanner, and a printer in the present illustrative aspect also includes an MFP. A plurality of printers 31 may be of different manufacturers, or of the same manufacturer but different models.

In what follows, the printer 31 means any one of the printers A to C and the MFP D.

(3) Adding and Switching of Communication Port

Figure 2:
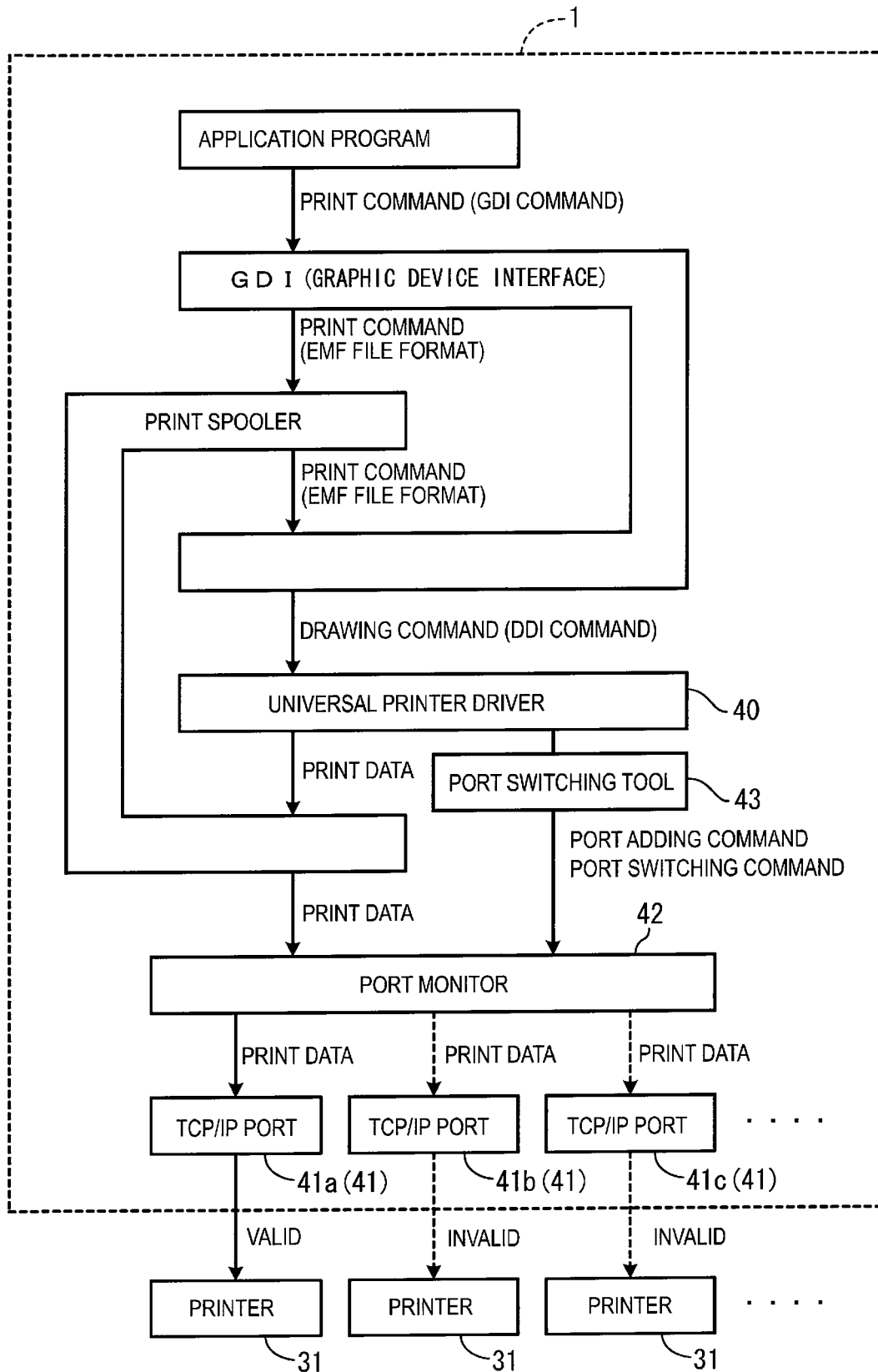
FIG. 2 is a pattern diagram for conceptually explaining adding and switching of a communication port.

FIG. 2 is a pattern diagram for conceptually explaining adding and switching of a communication port. Here, a TCP/IP port is used as an example of a communication port. The TCP/IP port is a logical interface for communicating with the printer 31 via the communication network 5. The TCP/IP port is referred to as a standard TCP/IP port in Windows. Additionally, a communication port is not limited to a TCP/IP port, and may be a serial port, a parallel port, and an USB port.

Addition of the communication port 41 is conducted through a port switching tool 43. The port switching tool 43 is a program to be installed at the same time the universal printer driver 40 is installed, as a part thereof. Upon receiving a request for adding a port from the universal printer driver 40, the port switching tool 43 outputs a port adding command to a port monitor 42. The port monitor 42 is a program provided by the OS. The port monitor 42 adds the communication port 41 using an IP address (a location information showing a location on the communication network 5) designated by the port adding command and provides the added communication port with a port name designated by the port adding command.

A plurality of communication ports 41 may exist as long as they have different port names. When received a port switching command, the port monitor 42 enables the communication port 41 that is identified by the port name designated by the port switching command. This allows the communication port to be set as a "communication port to be used".

(4) Window Transition

Figure 3:
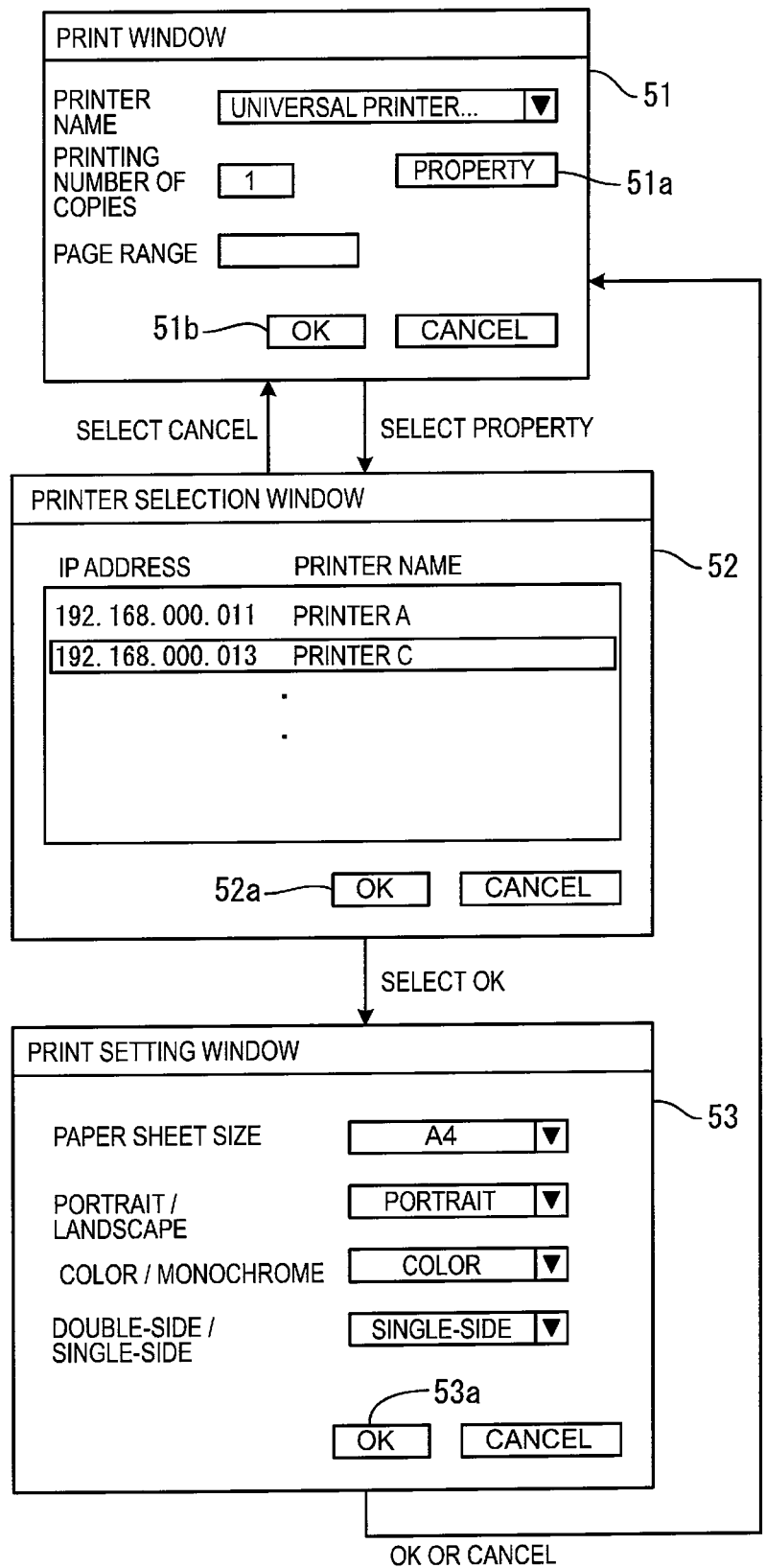
FIG. 3 is a window transition diagram showing windows displayed in printing processing.

FIG. 3 is a window transition diagram showing windows displayed on the display device 18 by the universal printer driver 40. The figure also shows a print window 51 displayed by the application.

In the present illustrative aspect, the PC 1 is shared by a plurality of users. Each user is assigned with an user ID and logs in with the own user ID to use the universal printer driver 40. For easier understanding, only one user can log-in here at one time.

The universal driver 40 calls up an API provided by the OS, so as to know a location of an user ID and a personal folder (a personal folder assigned for each user by the OS) of the user currently executing the universal driver 40 (the user logging in the PC 1).

When the user selects the printer 31 and clicks a "Property" button 51a on the print window 51 displayed by the application, a printer driver for the selected printer 31 is called up.

The universal printer driver 40 (see FIG. 2) is controllable of a plurality of models of printers and not supporting a particular printer 31. Therefore, when calling up the universal printer driver 40, the user directly selects the universal printer driver 40, not the printer 31, and then clicks the "Property" button 51a. Here, it is assumed that the universal printer driver 40 is selected, and the "Property" button 51a is clicked.

The called-up universal printer driver 40 then displays the printer selection window 52 for allowing the user to select a desirable printer 31. In particular, the universal printer driver 40 called up by the application sends data demanding device information to the printer 31 through a broadcast, and acquires the following device information as a reply.

The device information specifically includes a device name, location information showing a location on the communication network 5, such as, an IP address and a domain name, function information showing functions the device has, and the like. The function information includes detailed information of each function, such as, information showing a presence of a printer function, a scanner function, and a facsimile function, as well as information about a paper sheet size the printer function supports, an availability of double-side printing, and an availability of color printing.

The universal printer driver 40 displays in a list the printer information on the printer selection window 52, based on the device information acquired from each printer 31.

When the user selects the printer 31 and clicks an "OK" button 52a on the printer selection window 52, the universal printer driver 40 firstly determines whether the communication port 41 for communicating with the selected printer 31 is present or not. Acquiring the information of the communication port 41 from the OS determines whether the communication port 41 for communicating with the selected printer 31 is present or not.

When the communication port 41 for communicating with the selected printer 31 is not present, the universal printer driver 40 generates a port name (an example of port identification information) in accordance with a prescribed naming rule and designates the port name and an IP address of the selected printer 31, and then request the port switching tool 43 to add a port.

In the present illustrative aspect, a string of letters combining a prescribed string of letters showing the universal printer driver 40 with the IP address of the selected printer 31 by "_" is used as a port name.

Next, the universal printer driver 40 requests the port switching tool 43 to switch the port by designating the above-mentioned port name. Upon receiving the request for switching the port, the port switching tool 43 outputs a port switching command to the port monitor 42. The port monitor 42 then enables the communication port 41 which is identified by the designated port name. This allows the communication port 41 identified by the port name to be set as "communication port to be used".

Next, the universal printer driver 40 records in the memory 14 a port name of the communication port 41 for communicating with the printer 31 selected by the user associated with the user currently executing the universal printer driver 40 (the user logging in the PC 1).

In particular, the universal printer driver 40 creates an INI file assigned with a prescribed file name (for example, "Printer.ini") in a personal folder or in a prescribed folder created under a personal folder of the user executing the universal printer driver 40, and writes the port name in the INI file. The INI file is a text file in a prescribed format used generally in Windows and employed when, for example, recording setting information of an application.

Figure 4:
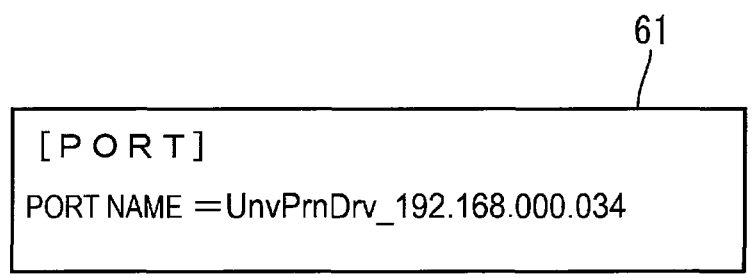
FIG. 4 is a pattern diagram showing an example of an INI file.

FIG. 4 is a pattern diagram showing an example of an INI file having a port name written therein. When the user had selected the printer 31 before, a port name has been already written in the INI file 61. In this case, the port name already written in the file is overwritten with a port name of the communication port 41 for communicating with the printer 31 newly selected by the user. In other words, a port name of the communication port 41 for communicating with the printer 31 selected last time by the user, who owns a personal folder storing the INI file 61, has been written in the INI file 61.

A hidden attribute is preferred to be set in the INI file 61. This can reduce the possibility of user's careless deletion of the INI file 61.

In addition, the universal printer driver 40 may record a port name associated with an user in methods other than writing in the INI file 61. For example, a port name associated with an user's user ID may be recorded by being written in a registry.

Back to FIG. 3, the universal printer driver 40 records the port name associated with the user, closes the printer selection window 52, and then displays the print setting window 53 for allowing the user to set print conditions. Print conditions are combinations of setting values of the print setting items, such as paper sheet size, portlate/landscape, color/monochrome, and double-side/single-side.

After the user's setting of the print conditions on the print setting window 53 and clicking on the "OK" button 53a, the selected printer and the print conditions are determined, and the print setting window 53 is closed, returning to the print window 51.

With the user's click on the "OK" button 51b on the print window 51, a print command is output to the universal printer driver 40 from the application through a GDI and a print spooler (see FIG. 2). A print command output from the GDI and the print spooler causes the universal printer driver 40 to execute the later-described printing processing.

Clicking on the "OK" button 51b is an example of an user's input of an execution instruction. The output of a print command from the OS to the universal printer driver 40 is an example of "execution instruction of a function from an operating system".

Here, selection of the printer 31 in each time is not always necessary, and when printing is executed by the same printer 31 as the last time, the "OK" button 51b on the print window 51 should be clicked, not the "Property" button 51a.

(5) Printing Processing

Next, the printing processing to be executed by the universal printer driver 40 when a print command is output from the OS is explained.

(5-1) General Flow of Printing Processing

Figure 5:
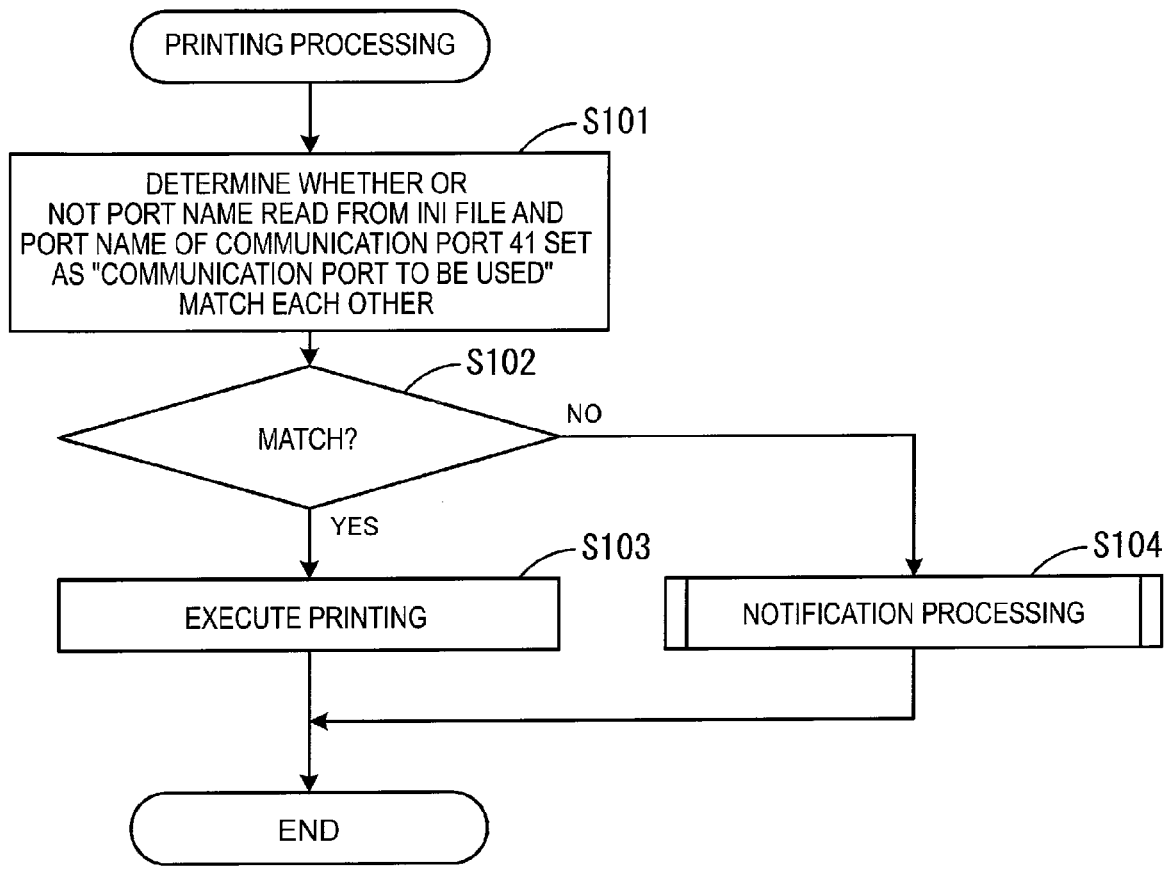
FIG. 5 is a flowchart showing a general flow of printing processing.

FIG. 5 is a flowchart showing a general flow of printing processing. In S101, the CPU 11 for executing the universal printer driver 40 (hereinafter, referred simply to as "printer driver") reads a port name from the INI file 61 stored in a personal folder of the user, who has input an execution instruction. Then, the CPU acquires a port name of the communication port 41 set as "communication port to be used" and determines whether or not these port names match each other.

In S102, when a match between these port names is determined in S101, the printer driver proceeds to S103; when a mismatch is determined, proceeds to S104.

In S103, the printer driver executes printing. In particular, the printer driver creates print data (an example of a control command for making the device to execute a function), based on a print command output from the application and the print conditions set on the print window 51 and on the print setting window 53 set by the user. Then, the printer driver outputs the print data to the communication port 41 set as "communication port to be used".

The print data output to the communication port 41 set as "communication port to be used" is then output to the printer 31 corresponding to the communication port 41, so that the printer 31 executes printing in accordance with the print data. This allows the printer 31 to execute printing.

In S104, the printer driver executes "notification processing" for notifying the user, who has input the execution instruction, of the change of "communication port to be used" and ends the processing.

(5-2) Notification Processing

Figure 6:
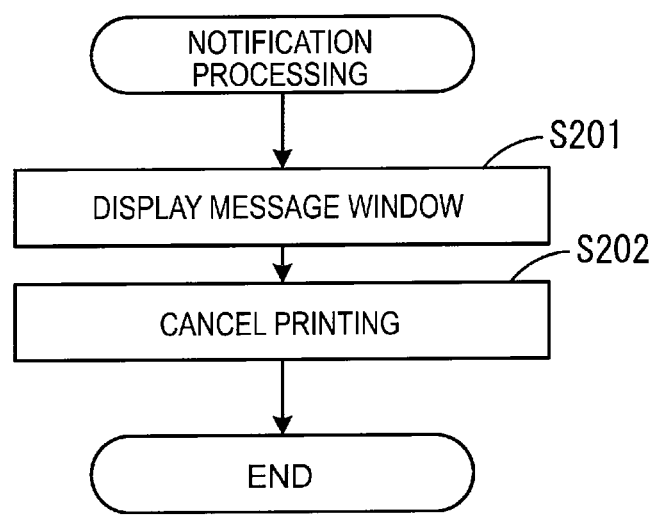
FIG. 6 is a flowchart showing a flow of notification processing.
Figure 7:
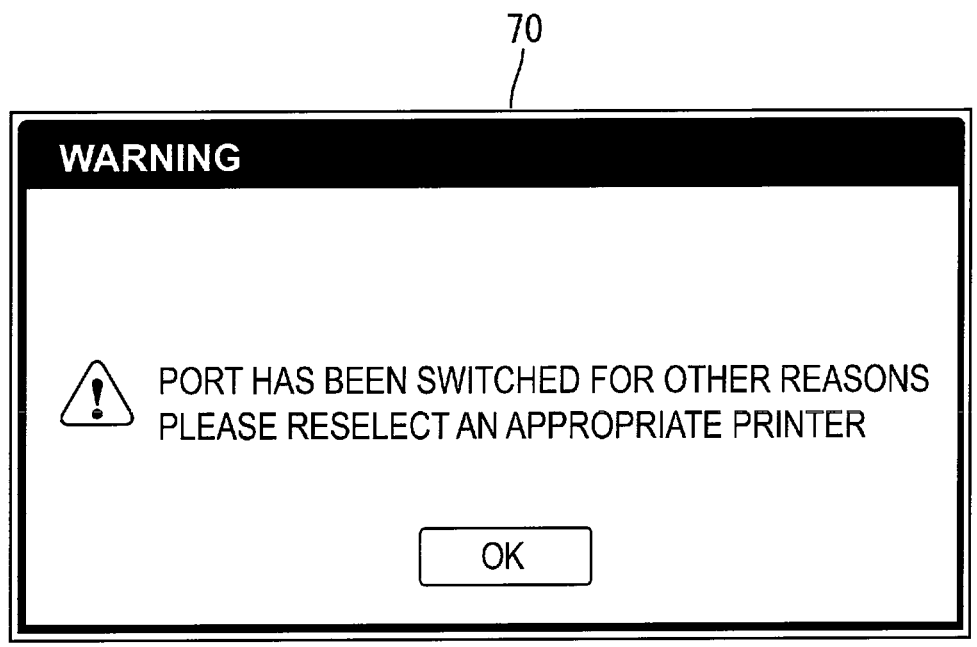
FIG. 7 is a pattern diagram showing an example of a message window.

FIG. 6 is a flowchart showing a flow of "notification processing".

In S201, the printer driver displays a message window 70 shown in FIG. 4 on the display device 18. As shown in the figure, a message "Port has been switched for other reasons. Please reselect an appropriate printer." is displayed on the message window 70.

In S202, the printer driver abandons the print command output from the OS. This cancels the printing.

(6) Effect of Illustrative Aspect

According to the universal printer driver 40 in the above-mentioned Illustrative aspect 1, when a port name associated with the user, who has input an execution instruction, and a port name of the communication port 41 set as "communication port to be used" do not match each other, the user, who has input the execution instruction, is notified of a change of "communication port to be used" (the message window 70 is displayed on the display device 18).

This allows the user to know the change of "communication port to be used", when the user did not know that "communication port to be used" has been changed by another user and input the execution instruction without selecting (designating) a device. The user who was notified of the change of "communication port to be used" then reselects the printer 31 after cancelling the printing and outputs the execution instruction again, so that the printing can be executed with the intended printer 31.

As mentioned, the universal printer driver 40, when being shared by a plurality of users on one PC 1, allows the user who has input the execution instruction to execute printing with the intended printer 31. This can reduce the user's confusion caused by the printing executed by the unintended printer 31.

Furthermore, according to the universal printer driver 40, when a port name associated with the user, who has input an execution instruction, and a port name of the communication port 41 set as "communication port to be used" do not match each other, the printing is cancelled. Therefore, careless printing executed by printers other than the intended printer 31 can be avoided.

<Illustrative Aspect 2>

Figure 8:
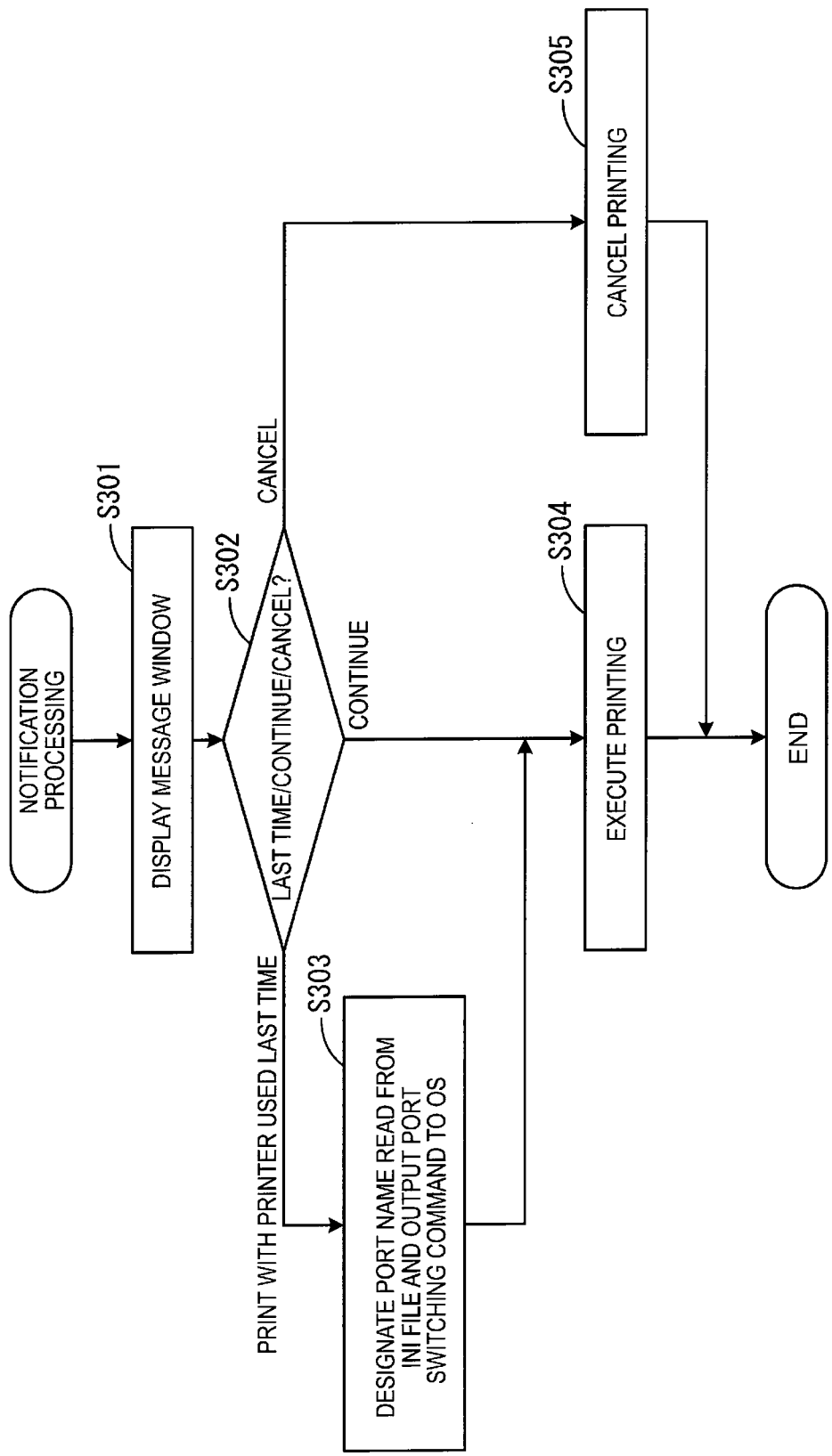
FIG. 8 is a flowchart showing a flow of "notification processing" according to Illustrative aspect 2.
Figure 9:
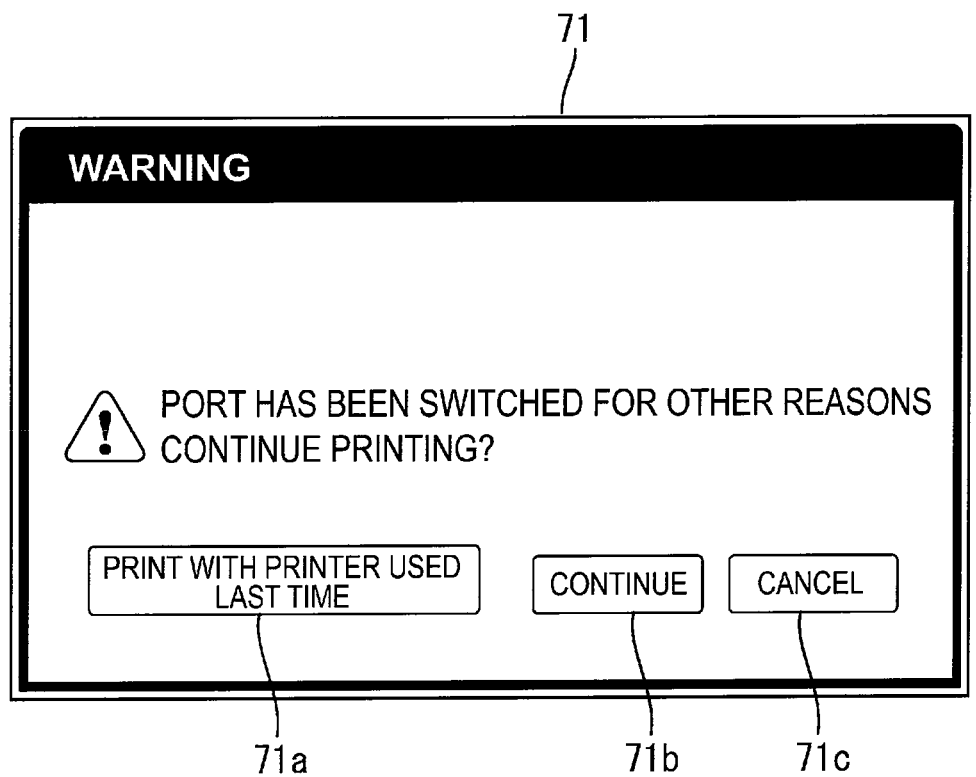
FIG. 9 is a pattern diagram showing an example of a message window.
Figure 10:
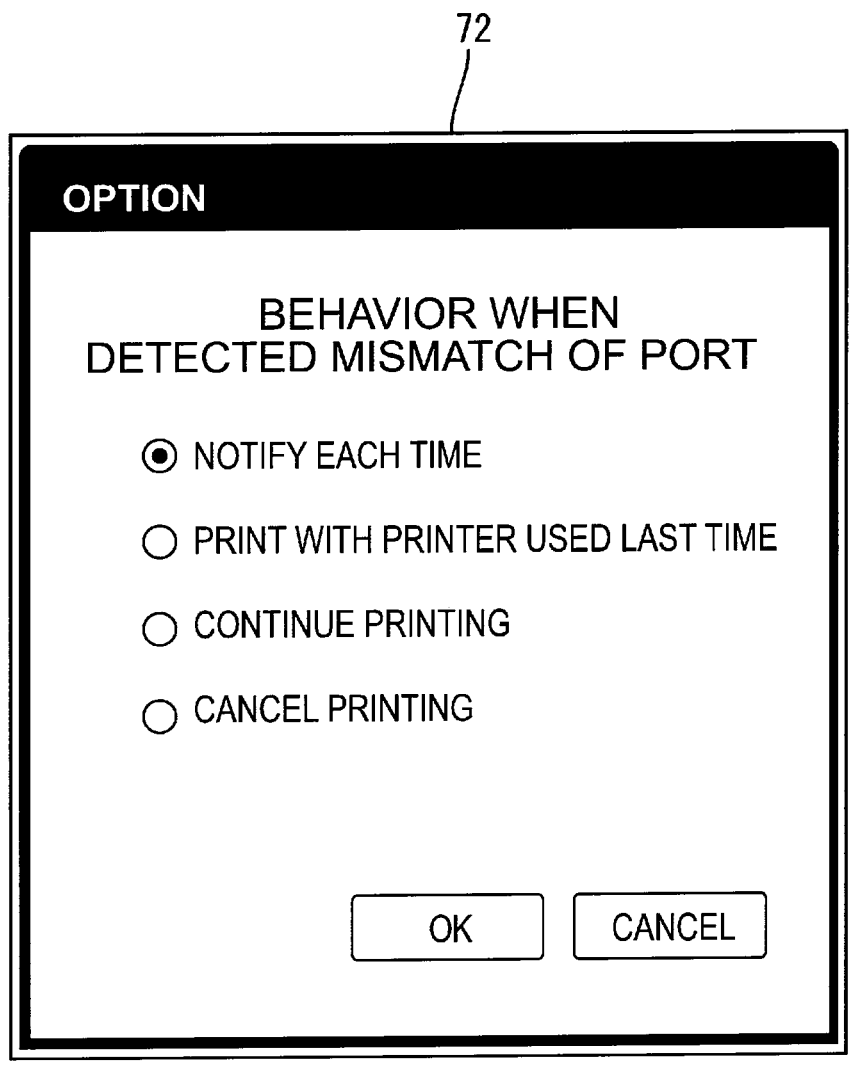
FIG. 10 is a pattern diagram showing an example of an option window.

Illustrative aspect 2 is explained in reference to FIGS. 8 to 10. Illustrative aspect 2 is a variation of Illustrative aspect 1. In Illustrative aspect 1, the printing is cancelled when a match was not determined in S102, however, in Illustrative aspect 2, the user is allowed to select processing when a match was not determined in S102, so as to execute the selected processing.

FIG. 8 is a flowchart showing a flow of "notification processing" according to Illustrative aspect 2. In S301, the printer driver displays a message window 71 shown in FIG. 9 on the display device 18, so as to allow the user to select processing.

As shown in the figure, a message "Port has been switched for other reasons. Continue printing?" is displayed on the message window 71. Provided on the message window 71 are a "Print with printer used last time" button 71a, a "Continue" button 71b, and a "Cancel" button 71c, and the user selects processing by clicking one of these buttons.

In S302, the printer driver determines which one of these buttons is clicked. When the "Print with printer used last time" button 71a is clicked, the printer driver proceeds to S303, when the "Continue" button 71*b* is clicked, proceeding to S304, and when the "Cancel" button 71*c* is clicked, proceeding to S305.

In S303, the printer driver reads a port name from the INI file 61 (for example, "Printer.ini") stored in a personal folder of the user who has input the execution instruction or a prescribed folder created under the name of a personal folder, then designates the read port name, and outputs a port switching command to the OS. This allows the communication port 41 identified by the read port name to be set as "communication port to be used".

In S304, the printer driver executes printing. The processing for executing the printing is same as the processing in S103, and its explanation is therefore omitted.

In S305, the printer driver executes printing.

According to the universal printer driver in the above-mentioned Illustrative aspect 2, an user can select processing to be executed after the notification.

<Illustrative Aspect 3>

Figure 11:
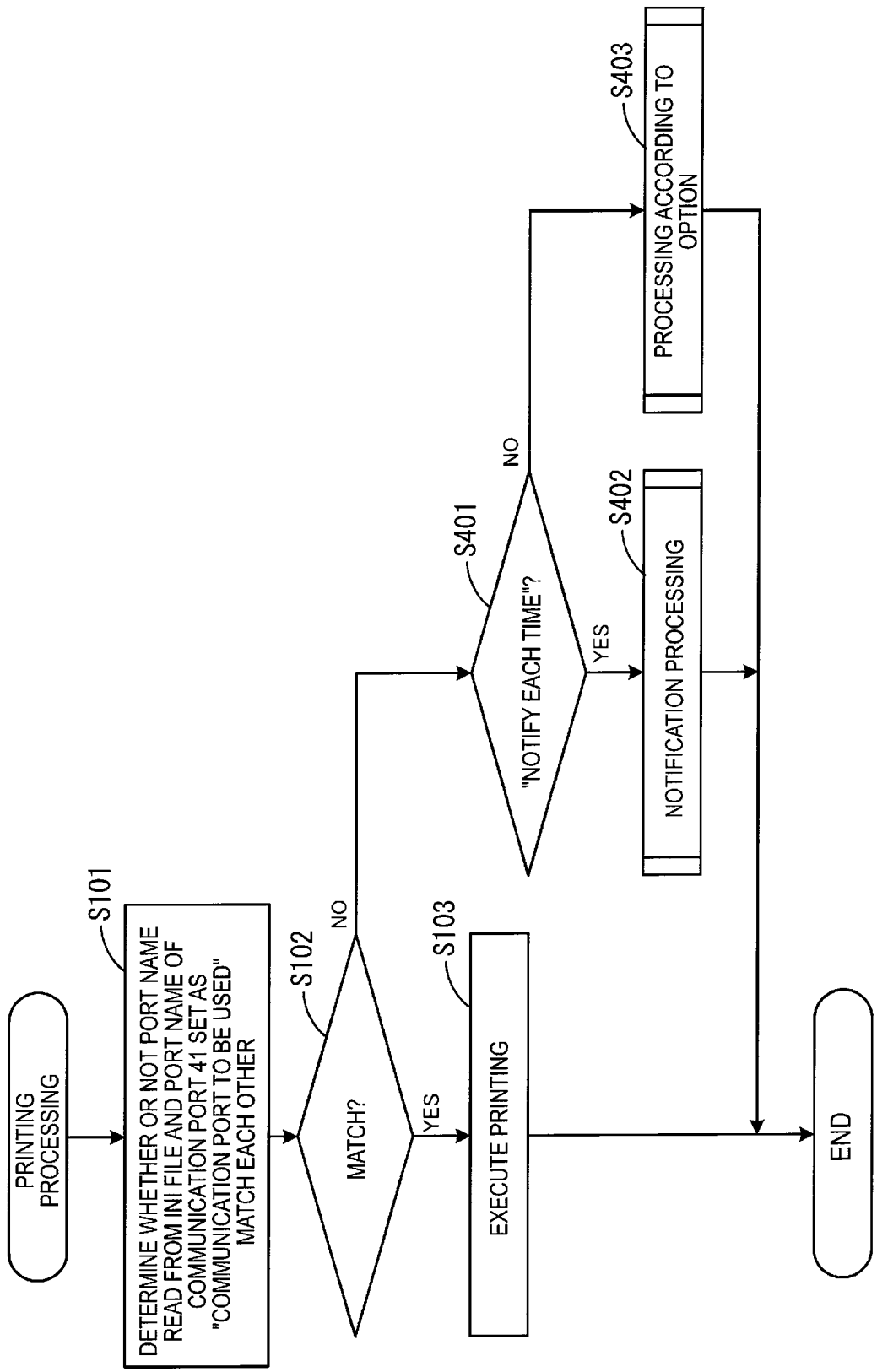
FIG. 11 is a flowchart showing a printing processing flow according to Illustrative aspect 3.
Figure 12:
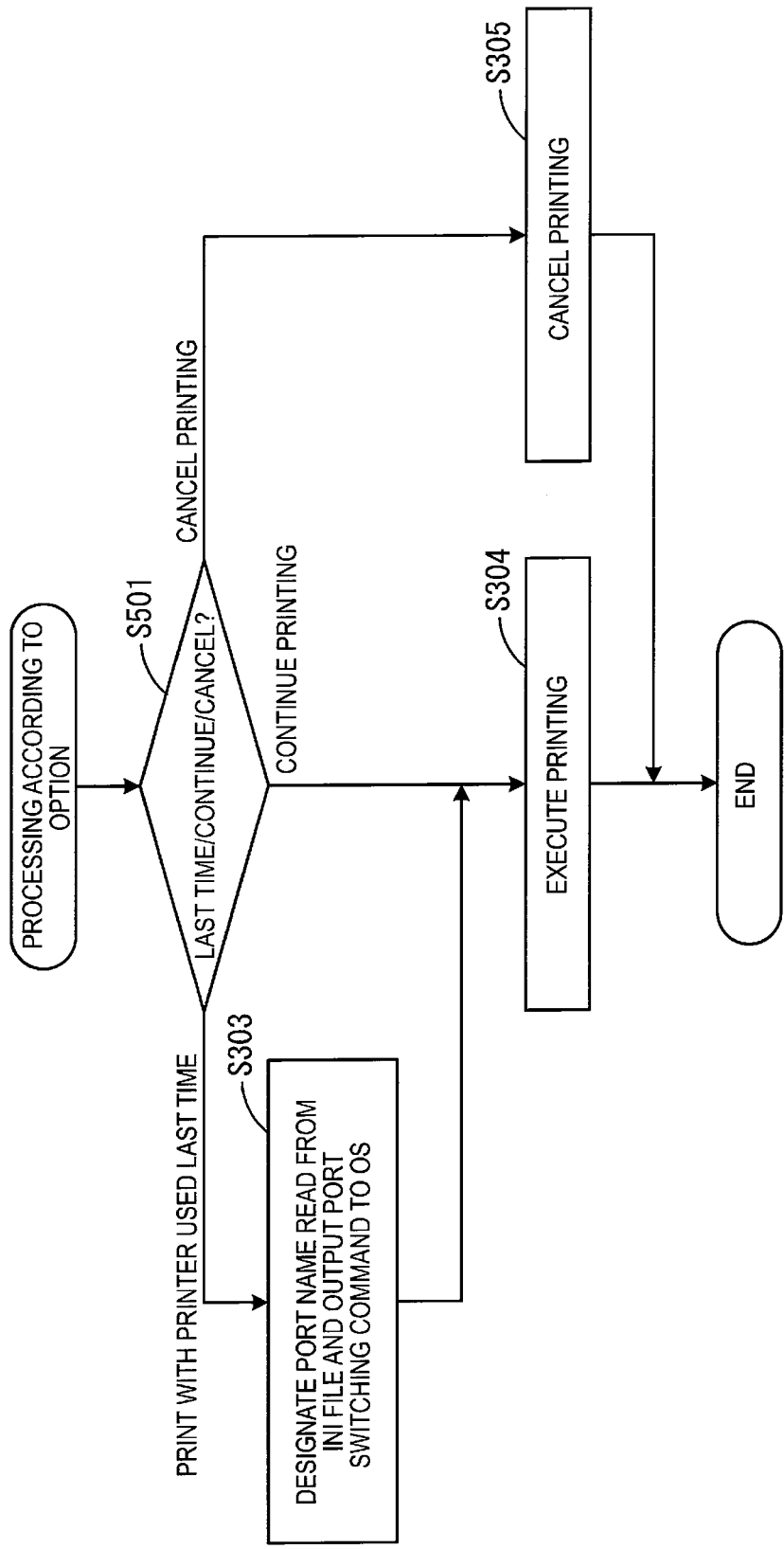
FIG. 12 is a flowchart showing a flow of "processing according to option".

Illustrative aspect 3 is explained in reference to FIGS. 11 and 12.

Illustrative aspect 3 is a variation of Illustrative aspect 2. In S301 in Illustrative aspect 2, the user selects processing after the notification is conducted, however, in Illustrative aspect 3, the user can select whether to select processing after the notification is conducted or to preliminarily select processing subsequent to the notification.

FIG. 10 is a pattern diagram showing an example of an option window for allowing an user to preliminarily select whether to select processing after the notification is conducted or to preliminarily select processing subsequent to the notification processing. The option window 72 can be called-up from the printer selection window 52. In particular, an "Option" button not shown is provided on the printer selection window 52 according to Illustrative aspect 3, so that the user can display the option window 72 by clicking the "Option" button.

As shown in the figure, four options: "Notify each time", "Print with printer used last time", "Continue printing", and "Cancel printing", are displayed on the option window 72, so that the user can select one option from these options.

FIG. 11 is a flowchart showing a printing processing flow according to Illustrative aspect 3. Here, the processing same as those in Illustrative aspect 1 are allocated with the same symbols, so that a repetitive description is omitted.

In S401, the printer driver determines whether "Notify each time" is selected on the option window 72 or not, and when so, proceeding to S402. When the option other than "Notify each time" is selected, the printer driver proceeds to S403.

In S402, the printer driver executes "notification processing" described in Illustrative aspect 2.

In S403, the printer driver executes "processing according to option".

FIG. 12 is a flowchart showing a flow of "processing according to option". Here, the processing fundamentally same as those in "notification processing" described in Illustrative aspect 2 are allocated with the same symbols, so that a repetitive description is omitted.

In S501, the printer driver determines which one of these options is selected. When "Print with printer used last time" is selected, the printer driver proceeds to S303, when the "Continue printing" is selected, proceeding to S304, and when the "Cancel printing" is selected, proceeding to S305.

According to the universal printer driver in the above-mentioned Illustrative aspect 3, an user can select whether to select processing after the notification is conducted or to preliminarily select processing subsequent to the notification.

<Other Illustrative Aspects>

The present invention is not limited to the aspects explained in the above description made with reference to the drawings. The following aspects may be included in the technical scope of the present invention, for example.

(1) In the above Illustrative aspect 1, when a port name associated with the user, who has input an execution instruction, and a port name of the communication port 41 set as "communication port to be used" do not match each other, the printing is cancelled by notification (by displaying the message window 70). However, the printing may be continued by selecting "Print with printer used last time", not being cancelled.

Or, the printer selection window 52 may be displayed (the designation processing may be executed) once again, so as to allow the user to reselect the printer 31. In this case, a port switching command for setting the communication port 41 for communicating with the printer 31, which has been reselected by the user, as "communication port to be used" may be output to the OS through the port switching tool 43, and after that, the print data may be output to "communication port to be used".

Or, "Continue printing" may be selected. In Illustrative aspect 1, the user cannot select processing subsequent to the notification, and when "Continue printing" is selected, the printing is therefore executed by the printer 31 other than the printer 31 the user firstly intended to use. However, this reduces user's confusion by previously notifying that the printing is not going to be executed with the printer 31 the user firstly intended to use.

(2) In the above Illustrative aspect 3, the user can select whether to select processing after conducting the notification or to preliminarily select processing. However, the user may not conduct this selection, and whether to select processing after conducting the notification or to select preliminarily may be fixed to one of these.

(3) In the above Illustrative aspect 2, "Print with printer used last time", "Continue", and "Cancel" are introduced as three example processing the user can select, however, the processing may include two of these processing. This also applies, when processing is preliminarily selected in Illustrative aspect 3. In addition, the processing may not limited to the above and may include, for example, allowing the user to select the printer 31 by displaying the printer selection window 52 once again.

(4) In the above illustrative aspects, an universal printer driver is introduced as an example of an universal driver, however, this is not limited to the above, and the universal driver may be, for example, an universal scanner driver.

What is claimed is:

1. A non-transitory computer readable medium storing a universal driver executable on a computer including an operating system, the universal driver comprising instructions for:

selecting a device for executing a function from devices connected to the computer with communication channels according to an input from a user of the universal driver;

sending a request to the operating system to set a communication port for communication with the selected device as a specified port;

storing port identification information of a communication port for communication with the selected device and associated with the user in a memory;

determining whether port identification information of the specified communication port matches the port identification information of the communication port associated with the user upon issuance of a request for executing the function from the operating system;

sending a control command to the device to execute the function via the specified communication port according to a result of the determination indicating a match; and notifying the user of a different port being set as a specified port according to a result of the determination indicating a non-match.

2. The non-transitory computer readable medium according to claim 1, wherein the universal driver further comprises instructions for:

canceling sending of the control command to the device to execute the function after the notification.

3. The non-transitory computer readable medium according to claim 1, wherein the universal driver further comprises instructions for:

reselecting a device according to an input from the user after the notification;

sending a request to the operating system for setting a communication port to communicate with the reselected device as a specified port; and sending a control command to the device to execute the function.

4. The non-transitory computer readable medium according to claim 1, wherein the universal driver further comprises instructions for:

sending a request to the operating system to set the communication port identified by the port identification information of the communication port associated with the user and stored in the memory as a specified port after the notification; and sending a control command to the device to execute the function.

5. The non-transitory computer readable medium according to claim 1, wherein the universal driver further comprises instructions for:

selecting a post-notification process from preset post-notification processes according to an input from the user after the notification; and executing the selected post-notification process.

6. The non-transitory computer readable medium according to claim 1, wherein the universal driver further comprises instructions for:

setting a post-notification process selected from preset post-notification processes according to an input from the user prior to the notification; and executing the set post-notification process after the notification.

7. The non-transitory computer readable medium according to claim 1, wherein the universal driver further comprising instructions for selecting any one of processes according to an input from the user, the processes including:

executing a post-notification process selected from preset post-notification processes according to an input from the user after the notification; and executing a post-notification process after the notification, the post-notification process being set by selecting from the preset post-notification processes according to an input from the user prior to the notification.

8. The non-transitory computer readable medium according to claim 4, wherein the preset post-notification processes include at least two of:

canceling sending of the control command to the device to execute the function;

sending the control command after reselecting a device according to an input from the user and setting a communication port to communicate with the selected device as a specified port by the operating system;

sending the control command after setting the communication port identified by the port identification information of the communication port associated with the user and stored in the memory by the operating system as a specified port; and sending the control command without a change to the specified communication port.

9. A method of controlling a device using a computer, comprising:

selecting a device for executing a function according to an input from a user, the device being connected to the computer with communication channels;

setting a communication port for communication with the selected device as a specified port;

storing port identification information of a communication port for communication with the selected device and associated with the user in a memory;

receiving a function execution request from the user;

determining whether port identification information of the specified communication port matches the port identification information of the communication port associated with the user;

sending a control command to the device to execute the function via the specified communication port when the port identification information of the specified communication port matches the port identification information of the communication port associated with the user; and notifying the user that a different port is set as a specified port when the port identification information of the specified communication port does not match the port identification information of the communication port associated with the user.

10. The method according to claim 9, further comprising: canceling sending of the control command to the device to execute the function after the notification.

11. The method according to claim 9, further comprising: reselecting a device according to an input from the user;

sending a request to the operating system for setting a communication port to communicate with the selected device as a specified port; and sending a control command to the device to execute the function.

12. The method according to claim 9, further comprising:

sending a request to the operating system to set the communication port identified by the port identification information of the communication port associated with the user and stored in the memory as a specified port after the notification; and sending a control command to the device to execute the function.

13. The method according to claim 9, further comprising:

selecting a post-notification process from preset post-notification processes according to an input from the user after the notification; and executing the selected post-notification process.

14. The method according to claim 9, further comprising:

setting a post-notification process selected from preset post-notification processes according to an input from the user prior to the notification; and executing the set post-notification process after the notification.

15. The method according to claim 9, further comprising selecting any one of processes according to an input from the user, the processes including:
- executing a post-notification process selected from preset post-notification processes according to an input from the user after the notification; and
- executing a post-notification process after the notification, the post-notification process being set by selecting from the preset post-notification processes according to an input from the user prior to the notification.

16. The method according to claim 13, wherein the preset post-notification processes include at least two of:
- canceling sending of the control command to the device to execute the function;
- sending the control command after reselecting a device according to an input from the user and setting a communication port to communicate with the selected device as a specified port by the operating system;
- sending the control command after setting the communication port identified by the port identification information of the communication port associated with the user and stored in the memory by the operating system as a specified port; and
- sending the control command without a change to the specified communication port.

17. An apparatus comprising:
- a processing unit; and
- memory for storing executable instructions that, when executed by the processing unit, cause the processing unit to function as:
- a selecting module configured to select a device for executing a function from devices connected to the computer with communication channels according to an input from a user of the universal driver;
- a first sending module configured to send a request to the operating system to set a communication port for communication with the selected device as a specified port;
- a storing module configured to store port identification information of a communication port for communication with the selected device and associated with the user in a memory;
- a determining module configured to determine whether port identification information of the specified communication port matches the port identification information of the communication port associated with the user upon issuance of a request for executing the function from the operating system;
- a second sending module configured to send a control command to the device to execute the function via the specified communication port according to a result of the determination indicating a match; and
- a notifying module configured to notify the user of a different port being set as a specified port according to a result of the determination indicating a non-match.

18. The apparatus according to claim 17, wherein the executable instructions, when executed by the processing unit, cause the processing unit to further function as:
- a canceling module configured to cancel sending the control command to the device to execute the function after the notification.

19. The apparatus according to claim 17, wherein the executable instructions, when executed by the processing unit, cause the processing unit to further function as:
- a reselecting module configured to reselect a device according to an input from the user after the notification;
- a third sending module configured to send a request to the operating system for setting a communication port to communicate with the reselected device as a specified port; and
- a fourth sending module configured to send a control command to the device to execute the function.

20. The apparatus according to claim 17, wherein the executable instructions, when executed by the processing unit, cause the processing unit to further function as:
- a third sending module configured to send a request to the operating system to set the communication port identified by the port identification information of the communication port associated with the user and stored in the memory as a specified port after the notification; and
- a fourth sending module configured to send a control command to the device to execute the function.

* * * * *